United States Patent
Said et al.

(10) Patent No.: US 10,666,960 B2
(45) Date of Patent: May 26, 2020

(54) METHOD AND DEVICE FOR PERFORMING GRAPH-BASED TRANSFORM USING GENERALIZED GRAPH PARAMETER

(71) Applicant: LG ELECTRONICS INC., Seoul (KR)

(72) Inventors: Amir Said, San Jose, CA (US); Yung-Hsuan Chao, San Jose, CA (US); Hilmi Enes Egilmez, San Jose, CA (US)

(73) Assignee: LG Electronics Inc., Seoul (KR)

( * ) Notice: Subject to any disclaimer, the term of this patent is extended or adjusted under 35 U.S.C. 154(b) by 359 days.

(21) Appl. No.: 15/526,897

(22) PCT Filed: Nov. 13, 2015

(86) PCT No.: PCT/KR2015/012218
§ 371 (c)(1),
(2) Date: May 15, 2017

(87) PCT Pub. No.: WO2016/076659
PCT Pub. Date: May 19, 2016

(65) Prior Publication Data
US 2017/0339422 A1   Nov. 23, 2017

Related U.S. Application Data

(60) Provisional application No. 62/079,566, filed on Nov. 14, 2014.

(51) Int. Cl.
*H04N 19/44* (2014.01)
*H04N 19/13* (2014.01)
(Continued)

(52) U.S. Cl.
CPC .......... *H04N 19/45* (2014.11); *H04N 19/117* (2014.11); *H04N 19/124* (2014.11); *H04N 19/13* (2014.11);
(Continued)

(58) Field of Classification Search
CPC ..................................................... H04N 19/60
(Continued)

(56) References Cited

U.S. PATENT DOCUMENTS

2010/0088668 A1    4/2010  Yoshihama et al.
2013/0247052 A1*   9/2013  Ali .......................... G06F 8/30
                                                    718/102
2013/0272422 A1   10/2013  Lee

FOREIGN PATENT DOCUMENTS

CN    1531348    9/2004
CN    1817031    8/2006
(Continued)

OTHER PUBLICATIONS

Graph Based Transforms for Depth Video Coding by Woo-Shik Kim. (Year: 2012).*
(Continued)

*Primary Examiner* — Eileen M Adams
*Assistant Examiner* — Daniel T Tekle
(74) *Attorney, Agent, or Firm* — Fish & Richardson P.C.

(57) ABSTRACT

The present invention provides a method for decoding a video signal using a graph-based transform including receiving a generalized graph signal including a graph parameter set; obtaining a graph-based transform kernel of a transform unit based on the graph parameter set and a predetermined penalty function; and decoding the transform unit using the graph-based transform kernel.

8 Claims, 10 Drawing Sheets

(51) Int. Cl.
*H04N 19/117* (2014.01)
*H04N 19/124* (2014.01)
*H04N 19/60* (2014.01)
*H04N 19/14* (2014.01)
*H04N 19/90* (2014.01)
*H04N 19/176* (2014.01)

(52) U.S. Cl.
CPC ........... *H04N 19/14* (2014.11); *H04N 19/176* (2014.11); *H04N 19/60* (2014.11); *H04N 19/90* (2014.11)

(58) Field of Classification Search
USPC .................................................. 375/240.01
See application file for complete search history.

(56) References Cited

FOREIGN PATENT DOCUMENTS

| | | |
|---|---|---|
| CN | 101123723 | 2/2008 |
| EP | 2582140 A2 | 4/2013 |
| JP | 2014007477 A | 1/2014 |
| KR | 10-2011-0315787 | 12/2011 |

OTHER PUBLICATIONS

Liu et al., "Motion-Adaptive Transforms Based on the Laplacian of Vertex-Weighted Graphs," Data Compression Conference (DCC), Mar. 2014, pp. 53-62.

Sandryhaila et al., "Discrete Signal Processing on Graphs," Signal Processing, IEEE Transactions on, Apr. 1, 2013, 61(7):1644-1656.

Seufert et al., "Bonsai: Growing Interesting Small Trees," MPI-I-2010-5-005, Nov. 2010, 27 pages.

Shuman et al., "The emerging field of signal processing on graphs: Extending high-dimensional data analysis to networks and other irregular domains," Signal Processing Magazine, IEEE, May 2013, 30(3):83-898.

Kim, et al., "Graph Based Transforms for Depth Video Coding," Acoustics, Speech and Signal Processing (ICASSP), 2012 IEEE International Conference on. IEEE, 2012, 4 pages.

Shen, et al., "Edge-adaptive transforms for efficient depth map coding," 28th Picture Coding Symposium (PCS), 2010 IEEE, 2010, pp. 566-569.

Extended European Search Report in European Application No. 15858287.4, dated Apr. 11, 2018, 8 pages.

Chinese Office Action in Chinese Application No. 201580061815.3, dated May 28, 2019, 16 pages (with English translation).

* cited by examiner

METHOD AND DEVICE FOR PERFORMING GRAPH-BASED TRANSFORM USING GENERALIZED GRAPH PARAMETER

CROSS-REFERENCE TO RELATED APPLICATIONS

This application is the National Stage filing under 35 U.S.C. 371 of International Application No. PCT/KR2015/012218, filed on Nov. 13, 2015, which claims the benefit of U.S. Provisional Applications No. 62/079,566, filed on Nov. 14, 2014, the contents of which are all hereby incorporated by reference herein in their entirety.

TECHNICAL FIELD

The present invention relates to a graph-based signal processing method and apparatus, and more particularly, to a method and apparatus for processing a signal for performing a graph-based prediction using an optimization function.

BACKGROUND ART

Most of the traditional discrete-time signal processing techniques have evolved directly from processing and filtering analog signals, and thus have been constrained by several common assumptions, like sampling and processing only regularly organized data. The field of video compression is based on basically the same assumptions, but only generalized to multi-dimensional signals.

A graph is a useful type of data representation for describing a geometrical structure of data in various application fields. Signal processing based on graph representations can generalize concepts like sampling, filtering, Fourier transforms, etc., using graphs where each signal sample represents a vertex, and signal relationships are represented by graph edges with positive weights. This disconnects the signal from its acquisition process, so that properties like sampling rate and sequences can be replaced by the properties of graph. Accordingly, more efficient signal processing method based on graph is required in many application fields as well as in the field of video compression.

DISCLOSURE

Technical Problem

Graph-based signal processing is a new technical field that generalizes various techniques and models of signal processing, and has already shown a promising result in many application fields. However, in the case that the graph-based signal processing technique is applied when compressing signals, in order to produce better signal transformation or prediction, it is required for both of an encoder and a decoder to use the same graph (e.g., a vertex, an edge and an edge weight). Although more improved signal compression may be attained using more complex and adaptive graph structure, the overhead for coding the information of the graph becomes greater relatively. Accordingly, there is a problem that the overhead becomes greater than the gain provided by it. Therefore, the present invention is to solve such a problem.

In addition, the present invention is to provide a new method for calculating a graph-based transform using generalization of the conventional spectral decomposition. In addition, the present invention is to better control transform properties through such a generalization, and to be applicable to various applications.

Furthermore, the present invention is to propose a method for detecting a vertex and an edge in a graph and for encoding or decoding a residual signal.

In addition, the present invention develops a graph-based tool for better coding set of prediction residual values.

Technical Solution

The present invention provides a method for generalizing the definition of graph parameters.

In addition, the present invention provides a method for obtaining a graph signal using at least one of a vertex parameter set and an edge parameter set.

In addition, the present invention provides a method for obtaining an optimized transform kernel based on at least one of a penalty function and a constraint function.

In addition, the present invention provides a method for deriving an eigenvalue function by applying a penalty function predefined for a graph signal.

In addition, the present invention provides a method for obtaining a graph-based transform kernel that optimizes an eigenvalue function.

In addition, the present invention proposes a method for detecting a vertex and an edge in a graph and for encoding or decoding a residual signal.

Technical Effects

The graph-based signal modeling to which the present invention is applied may be a powerful tool. Particularly, the present invention provides a new method for calculating a graph-based transform using generalization of the conventional spectral decomposition, thereby avoiding the sharp discontinuity problem of vectors for defining the graph-based transform.

In addition, the present invention may better control the transform properties through the generalization of the conventional spectral decomposition, and may be applicable to various applications.

In addition, the present invention may improve the compression efficiency by adaptively using the statistical properties of a signal in different parts of a video sequence.

In addition, the present invention may avoid an excessive overhead of a bit rate required to encode a graph signal through the generalization of the conventional spectral decomposition.

BEST MODE FOR INVENTION

Figure 1:
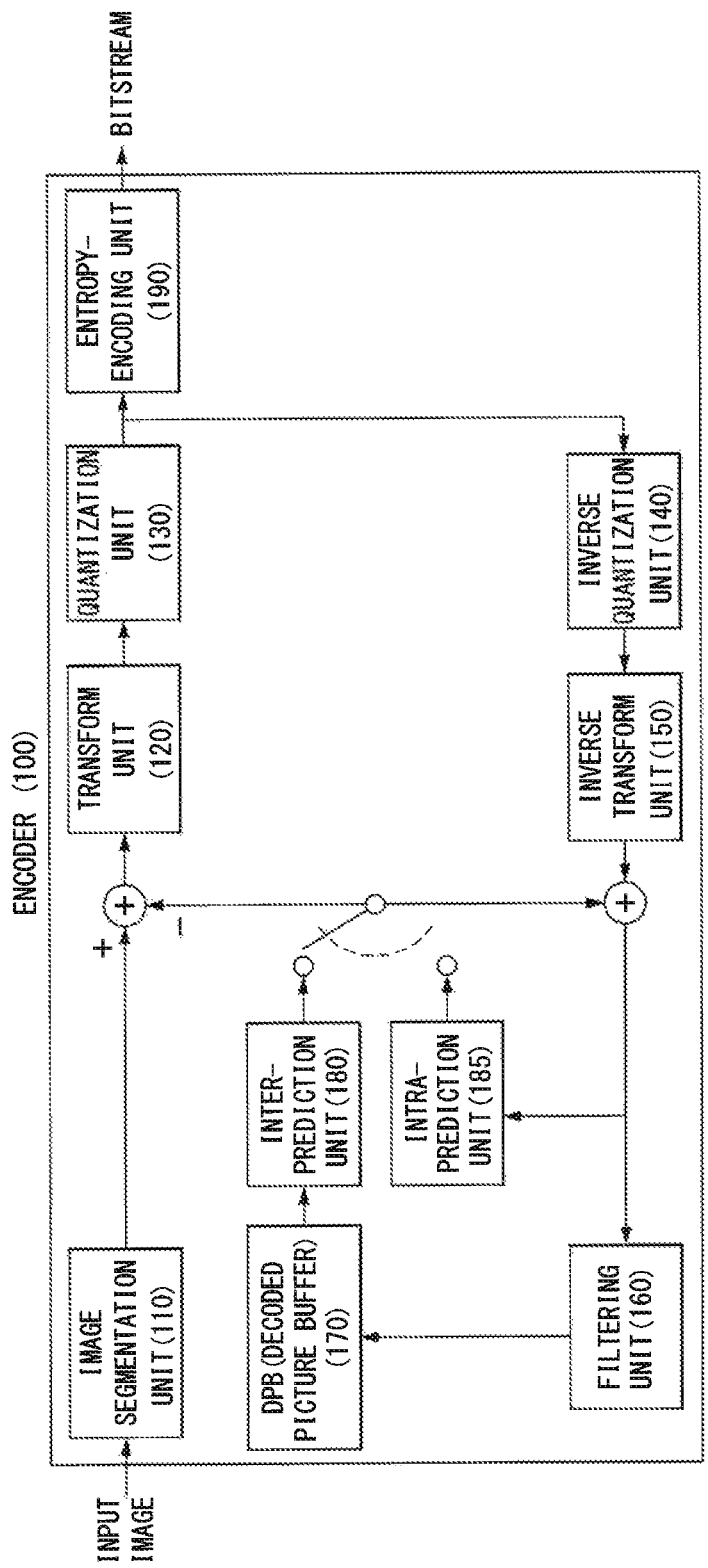
FIG. 1 shows a schematic block diagram of an encoder for encoding a video signal, in accordance with one embodiment of the present invention.

The present invention provides a method for decoding a video signal using a graph-based transform including receiving a generalized graph signal including a graph parameter set; obtaining a graph-based transform kernel of a transform unit based on the graph parameter set and a predetermined penalty function; and decoding the transform unit using the graph-based transform kernel.

In addition, in the present invention, the graph parameter set includes at least one of a vertex parameter set represented as V-dimensional vector and an edge parameter set represented as V×V matrix.

In addition, in the present invention, the predetermined penalty function is generated based on the generalized graph signal.

In addition, in the present invention, the graph-based transform kernel is obtained by an optimization function based on the graph parameter set and the predetermined penalty function.

In addition, in the present invention, wherein the optimization function is comprised of a summation of a first penalty function component for a vertex parameter set and a second penalty function component for an edge parameter set, and wherein the graph-based transform kernel indicates a value in which the optimization function is a minimum.

In addition, the present invention provides a method for performing a graph-based transform based on a generalized graph signal including determining a graph parameter including at least one of a vertex parameter set and an edge parameter set; generating a generalized graph signal based on the graph parameter; generating at least one of a penalty function and a constraint function based on the graph parameter; generating an optimization function based on at least one of the penalty function and the constraint function and the generalized graph signal; obtaining an optimal graph-based transform kernel in which the optimization function is a minimum; and performing a transform for a transform unit using the optimal graph-based transform kernel.

In addition, the present invention provides an apparatus for decoding a video signal using a graph-based transform an entropy decoding unit configured to receive a generalized graph signal including a graph parameter set; and an inverse transform unit configured to obtain a graph-based transform kernel of a transform unit based on the graph parameter set and a predetermined penalty function, and to decode the transform unit using the graph-based transform kernel.

In addition, the present invention provides an apparatus for performing a graph-based transform using a generalized graph signal a graph signal generating unit configured to determine a graph parameter including at least one of a vertex parameter set and an edge parameter set, and to generate a generalized graph signal based on the graph parameter; a transform matrix obtaining unit configured to generate at least one of a penalty function and a constraint function based on the graph parameter, to generate an optimization function based on at least one of the penalty function and the constraint function and the generalized graph signal, and to obtain an optimal graph-based transform kernel in which the optimization function is a minimum; and a transform performing unit configured to perform a transform for a transform unit using the optimal graph-based transform kernel.

MODE FOR INVENTION

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

In addition, embodiments proposed in this specification is directed to video signal processing, but the present invention should not be construed as being based on only video signal processing, and may be applicable to a method of processing general graph-based signal.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process.

By applying a linear transform that adaptively modifies the statistical properties of a signal in different parts of a video sequence, compression efficiency may be improved. General statistical methods have been tried such an object, but they bring a restricted result. The present invention introduces a graph-based signal processing technique as a more efficient method for modeling the video statistical properties for video compression.

In order to simplify mathematical analysis and to use the result known from a graph theory, most of applications developed for the graph-based signal processing uses an undirected graph without self-loop (i.e., there is no edge that connects nodes in itself.), and models with non-negative edge only in each graph edge.

Such an approach may be successfully applied for signaling an image of well defined discontinuity, sharp edge or a depth image. The graphs corresponding to $N^2$ pixel blocks in an image and video application require transmission overhead for $2N^2$ or $4N^2$ non-negative edge weights, generally. After a graph is defined, the orthogonal transform for coding or prediction may be induced by calculating spectral decomposition of a graph Laplacian matrix. For example, through the spectral decomposition, an eigenvector and an eigenvalue may be obtained.

The present invention provides a new method for modifying the procedure of calculating a graph-based transform using new generalization of the conventional spectral decomposition. Here, the transform obtained from a graph signal may be defined as Graph-Based Transform (hereinafter, GBT). For example, when the relation information between pixels constructing a TU is represented in a graph, the transform obtained from the graph may be referred to as GBT.

The general form of the spectral decomposition to which the present invention is applied may be obtained based on an additional set of graph edge parameters that have desired properties and graph vertex parameters. Through such an embodiment of the present invention, the transform properties may be well controlled, and the problem of sharp discontinuities of the vectors defining transform may be avoided. Hereinafter, the embodiments to which the present invention will be described in detail.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

In an embodiment of the present invention, the transform unit 120 may obtain a graph signal using a generalized graph parameter.

In another embodiment of the present invention, the transform unit 120 may obtain a graph signal using at least one of a vertex parameter set and an edge parameter set, and may derive an eigenvalue function by applying a predefined penalty function to the graph signal.

In another embodiment of the present invention, the transform unit 120 may obtain an optimized transform kernel based on at least one of a penalty function and a constraint function. In this case, the optimized transform kernel may be a value that optimizes the eigenvalue function.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

Figure 2:
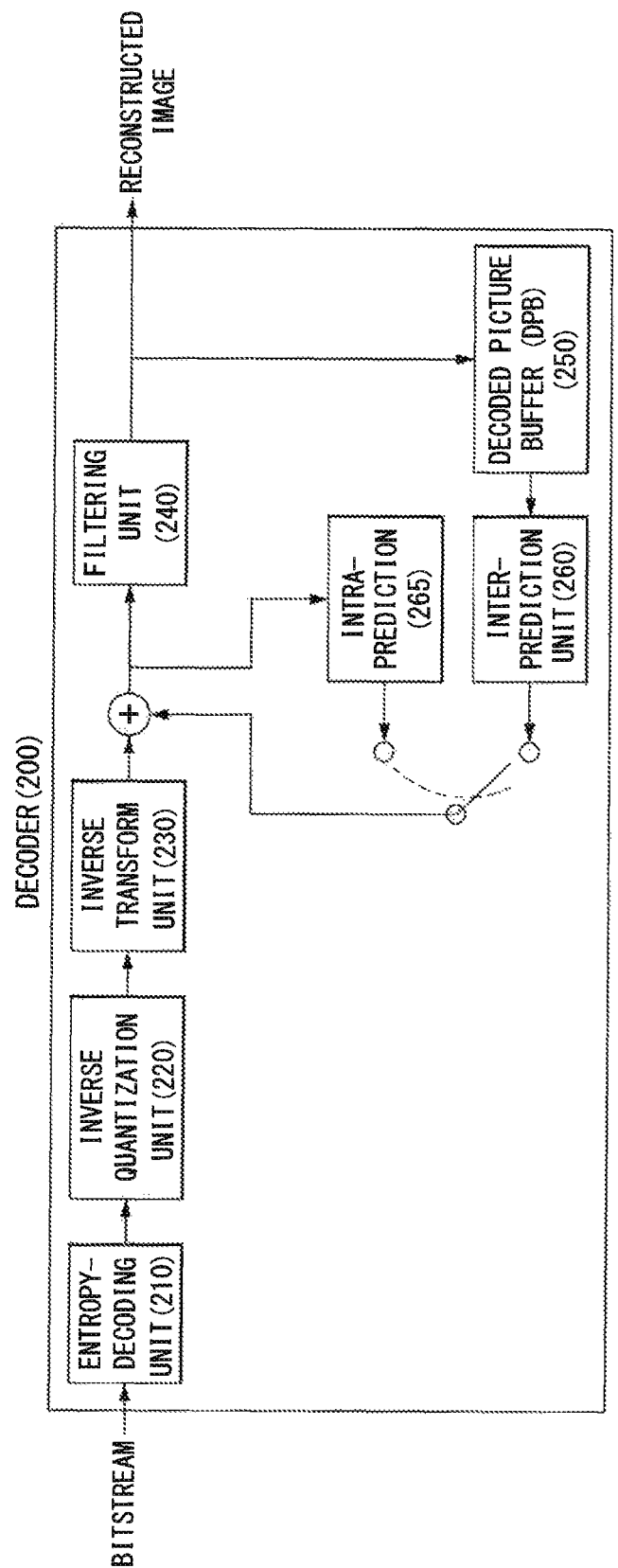
FIG. 2 shows a schematic block diagram of a decoder for decoding a video signal, in accordance with one embodiment of the present invention.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

Figure 3:
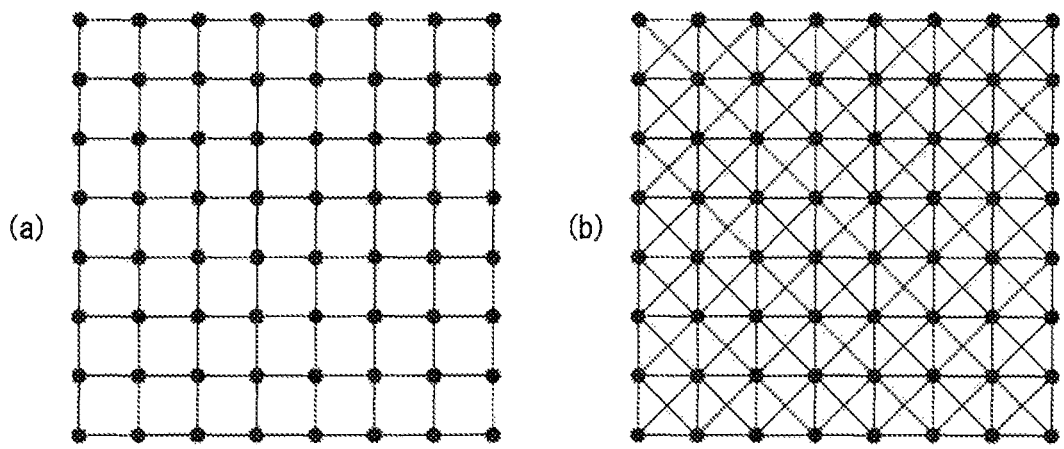
FIG. 3 shows examples of graphs used for modeling statistical relationships in 8×8 block within a video frame according to an embodiment to which the present invention is applied.

FIG. 3 shows examples of graphs used for modeling statistical relationships in 8×8 block within a video frame according to an embodiment to which the present invention is applied.

The discrete-time signal processing technique has been developed from directly processing and filtering an analogue signal, and accordingly, has been restricted by a few common assumptions such as sampling and processing regularly organized data only.

Basically, the video compression field is based on the same assumption, but has been generalized for a multi-dimensional signal. The signal processing based on a graph representation generalizes the concepts such as sampling, filtering and Fourier transform, uses the graph that represents a vertex by each signal sample, and is started from the conventional approach in which signal relationships are represented by graph edges with positive weights. This completely isolates a signal from its acquisition process, and accordingly, the properties such as sampling rate and sequence are completely replaced by the properties of a graph. Accordingly, the graph representation may be defined by a few specific graph models.

In order to represent an empirical connection between data values, the present invention has an undirected simple graph and an undirected edge only, normally. Here, the undirected simple graph may mean a graph without self-loop or multiple edges.

When the undirected simple graph that has a weight allocated for each edge is referred to as G, the undirected simple graph G may be described with triplet as represented in Equation 1.

$$\mathcal{G} = \{\mathcal{V}, \varepsilon, W\} \quad \text{[Equation 1]}$$

Here, V represents V numbers of graph vertex set, ε represents a graph edge set, and W represents a weight represented as V×V matrix. Here, weight W may be represented as Equation 2 below.

$$W_{i,j} = W_{j,i} \geq 0 \quad \text{[Equation 2]}$$

$W_{i,j}$ represents a weight of edge (i, j), and $W_{j,i}$ represents a weight of edge (j, i). When there is no edge connecting vertex (i, j), $W_{i,j}=0$. For example, in the case of assuming that there is no self-loop, $W_{i,i}=0$, always.

The representation is partially overlapped for a special case of the undirected simple graphs that have an edge weight. This is because matrix W includes all types of information of the graph. Accordingly, in the present invention, hereinafter, a graph is represented as G(W).

Meanwhile, referring to FIG. 3, the present invention provides two embodiments of graph types that may be used for processing 8×8 pixel blocks in an image or a video. Each pixel is in relation to a graph vertex, and the pixel value becomes the value of the graph vertex.

A graph edge may mean a line connecting graph vertexes. The graph edge is used for representing a certain type of statistical dependency within a signal, and in this case, a positive weigh may represent the sharpness. For example, each vertex may be connected to all of other vertexes, and weight of 0 may be allocated to an edge that connects vertexes not coupled with each other or weakly coupled. However, for simplifying the representation, the edge having the weight of 0 may be completely removed.

As another embodiment of the present invention, the edges connecting graph vertexes may be preconfigured depending on a signal property. For example, the vertexes may be arranged on 1-dimensional array for an audio signal, on 2-dimensional array for an image, and on 3-dimensional array for a video frame. In this case, for the 3-dimensional array, a time axis may be the third dimension. For example, in the graph shown in FIG. 3(*a*), a graph edge may be defined such that each vertex is connected to the nearest 4 adjacent vertexes. However, a block edge may be differently treated. In addition, in the graph shown in FIG. 3(*b*), it may be defined that each vertex is connected to the nearest 8 adjacent vertexes.

Figure 4:
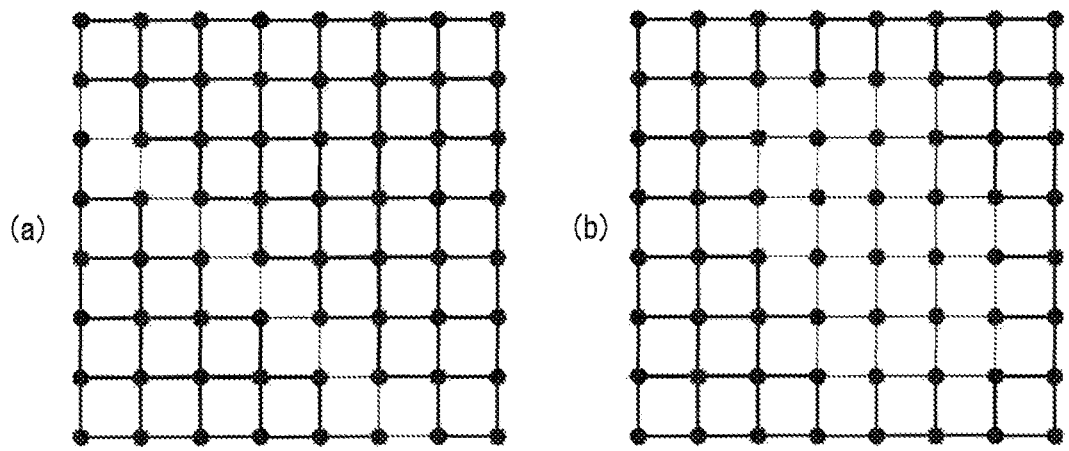
FIG. 4 shows a graph of two shapes representing weights distribution as an embodiment to which the present invention is applied.

FIG. 4 shows a graph of two shapes representing weights distribution as an embodiment to which the present invention is applied.

The vertex value of a graph is an independent variable based on a signal measurement (normally, modeled as an arbitrary variable), but it is required to select an edge weight in accordance with the property of a part of signal. FIG. 4 shows two exemplary graphs that represent the edge weights of different lines for a graph edge. For example, the bold lines may represent the weight of w=1, and the fine lines may represent the weight of w=0.2.

The graph shown in FIG. 4(a) represents the case of having "weak link" along a straight line, and represents the case of having two edge weights only. Here, the "weak link" means having relatively small edge weight.

This is commonly used in a graph-based image processing actually, and such a construction may represent a difference between an edge in an image and a pixel statistics between different sides.

FIG. 4(b) represents a distribution of an edge weight that covers irregular area. The present invention is to provide a method for processing a signal using such a distribution graph of an edge weight.

Figure 5:
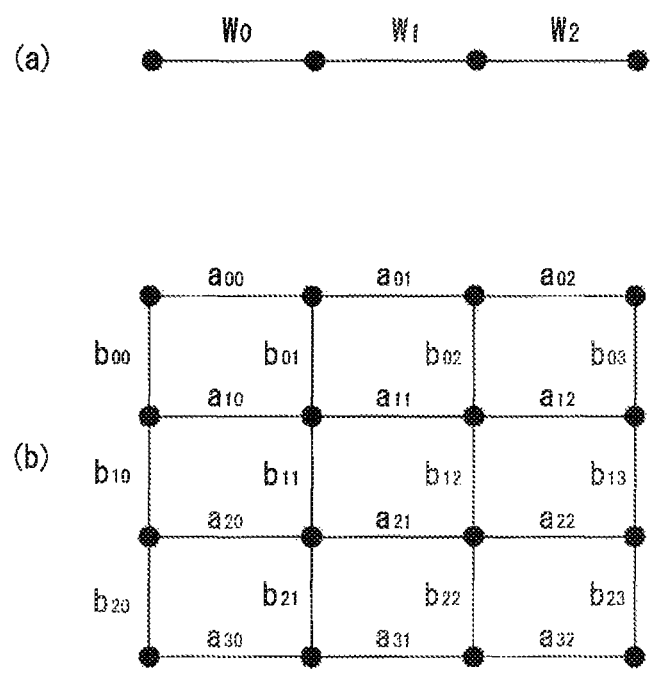
FIG. 5 is a diagram for describing a procedure of obtaining a graph-based transform matrix based on 1-dimensional graph and 2-dimensional graph as an embodiment to which the present invention is applied.

FIG. 5 is a diagram for describing a procedure of obtaining a graph-based transform matrix based on 1-dimensional graph and 2-dimensional graph as an embodiment to which the present invention is applied.

As an embodiment of the present invention, the graph type that may be used for processing a pixel block in an image may be described using FIG. 5. For example, FIG. 5(a) shows 1-dimensional graph that corresponds to each line in the pixel block, and FIG. 5(b) shows 2-dimensional graph that corresponds to the pixel block.

A graph vertex is in relation to each pixel of the pixel block, and a value of the graph vertex may be represented as a pixel value. And, a graph edge may mean a line connecting the graph vertexes. The graph edge is used for representing a certain type of statistical dependency in a signal, and the value representing its sharpness may be referred to as an edge weight.

For example, FIG. 5(a) shows a 1-dimensional graph, 0, 1, 2 and 3 represents the position of each vertex, and $w_0$, $w_1$ and $w_2$ represent the edge weight between vertexes. FIG. 5(b) shows a 2-dimensional graph, and $a_{ij}$ (i=0, 1, 2, 3, j=0, 1, 2) and $b_{ki}$ (k=0, 1, 2, l=0, 1, 2, 3) represent the edge weight between vertexes.

Each vertex may be connected to all of other vertexes, and weight of 0 may be allocated to an edge that connects vertexes not coupled with each other or weakly coupled. However, for simplifying the representation, the edge having the weight of 0 may be completely removed.

The relationship information between pixels may be represented as whether there is an edge between pixels and an edge weight when each pixel is mapped to a vertex of a graph.

In this case, the GBT may be obtained through the following procedures. For example, an encoder or a decoder may obtain graph information from a target block of a video signal. From the obtained graph information, Laplacian matrix L may be obtained as represented in Equation 3 below.

$$L=D-A \quad \text{[Equation 3]}$$

In Equation 3 above, D represents a degree matrix. For example, the degree matrix may mean a diagonal matrix including the information of a degree of each vertex. A represents an adjacency matrix that represents the interconnection (edge) with an adjacent pixel by a weight.

And, with respect to the Laplacian matrix L, a GBT kernel may be obtained by performing an eigen decomposition as represented in Equation 4 below.

$$L=U\Lambda U^T \quad \text{[Equation 4]}$$

In Equation 4 above, L means a Laplacian matrix L, U means an eigen matrix, and $U^T$ means a transposed matrix of U. In Equation 4, the eigen matrix U may provide a graph-based Fourier transform specialized for a signal suitable for the corresponding model. For example, the eigen matrix U that satisfies Equation 4 may mean a GBT kernel.

Figure 6:
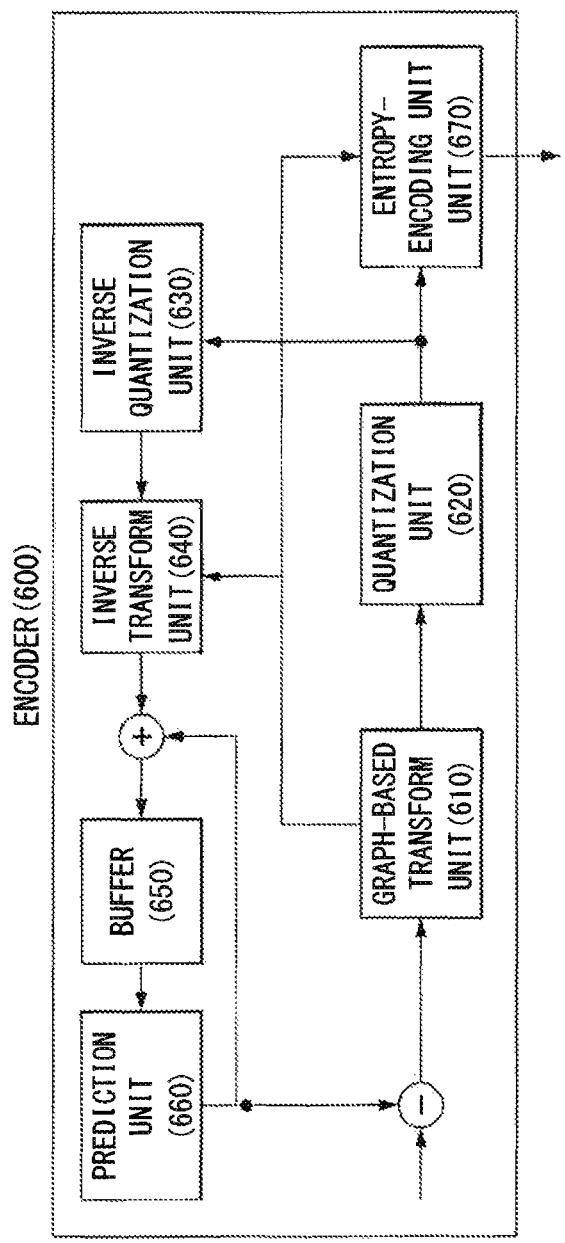
FIG. 6 illustrates a schematic block diagram of an encoder for processing a graph-based signal as an embodiment to which the present invention is applied.

FIG. 6 illustrates a schematic block diagram of an encoder for processing a graph-based signal as an embodiment to which the present invention is applied.

The Fourier transform or the discrete Fourier transform is a basic tool for signal processing. There is also a graph Fourier transform. Generally, such transforms are identically applied for a few special graphs, but may provide a much wider generalized shape that may be applied to various applications in the present invention. In the embodiments to which the present invention is applied, a graph may provide insight for a signal property. In order to define a Fourier transform of a graph, the present invention may be represented by a degree matrix that corresponds to G (W). Here, the degree matrix is a diagonal matrix including the information of a degree of each vertex, and may be defined as Equation 5 below. For example, the degree may mean the number of a side connected to a vertex.

$$D_{i,j} = \begin{cases} \sum_{k=1}^{V} W_{i,k}, & i = j \\ 0, & i \neq j \end{cases} \quad i, j = 1, 2, \ldots, V. \quad \text{[Equation 5]}$$

Graph Laplacian matrix L=D−W, and accordingly, graph Laplacian matrix $L_{i,j}$ is as represented as Equation 6 below.

$$L_{i,j} = \begin{cases} \sum_{k=1}^{V} W_{i,k}, & i = j \\ -W_{i,j}, & i \neq j \end{cases} \quad i, j = 1, 2, \ldots, V. \quad \text{[Equation 6]}$$

In this case, when matrix T is the graph Fourier transform, matrix T is as represented as Equation 7 below.

$$T(W)=U^T \quad \text{[Equation 7]}$$

Herein, U represents an eigen matrix that diagonalizes L, and L is as represented as Equation 8 below.

$$L=U\Lambda U^{-1}=U\Lambda U^T \quad \text{[Equation 8]}$$

And, an orthogonal matrix satisfies Equation 9 below.

$$U^T=U^{-1} \quad \text{[Equation 9]}$$

Based on the definition above, the columns of eigen matrix U includes eigenvectors of L, and eigenvalues of L may be represented as Equation 10 below.

$$\Lambda=\text{diag}(\lambda), \quad \text{[Equation 10]}$$

Generally, eigenvectors are not defined as a specific shape. However, according to an object of the present invention, since L is symmetric, it should be considered that all eigenvectors are real values, and at least one of decomposition may be existed. This may be applied to any matrix that satisfies Equation 8.

In a few applications to which the present invention is applied, a transform matrix may be obtained from the spectral decomposition of a normalized Laplacian matrix as represented in Equation 11 below.

$$\bar{L} = D^{-1/2} L D^{-1/2} \quad \text{[Equation 11]}$$

In order to define Fourier transform, graph Laplacian matrix L may be represented as Equation 12 below, and for the eigenvectors of graph Laplacian matrix L, the present invention may obtain Equation 13 below.

$$h^T L h = \sum_{i=1}^{V} \sum_{j=1}^{V} W_{i,j} (h_i - h_j)^2, \quad \text{[Equation 12]}$$

$$\lambda_k = u_k^T L u_k = \sum_{i=1}^{V} \sum_{j=1}^{V} W_{i,j} (U_{i,k} - U_{j,k})^2, \quad k = 1, 2, \ldots, V. \quad \text{[Equation 13]}$$

Here, $\lambda_k$ represents an eigenvalue of graph Laplacian matrix L.

In the present invention, in the case that eigenvalues may be distinguished in an ascending order, the Equations above may mean that the corresponding eigenvectors define the graph vertex values that increase the sum in which a weight is applied for a square difference. In a general signal processing, such a property may be satisfied by a sine wave of an increasing frequency. In addition, such a property may be used for generalizing a frequency concept in the graph-based transform that corresponds to Laplacian eigenvalues.

The spectral decomposition may be efficiently calculated by a few other algorisms, for example, Jacobi, Givens, Householder method, and so on. However, in the graph-based signal processing, the present invention is to consider that eigenvectors may be calculated as $\{U_1, U_2, \ldots, U_V\}$ consequently using Rayleigh quotient in Equation 15 below that represents an optimization function.

$$R(M, x) := \frac{x^* M x}{x^* x} \quad \text{[Equation 14]}$$

$$u_k = \arg\min_{b} \left\{ \frac{h^T L h}{h^T h} \right\} \text{ s.t. } u_i^T h = 0, i = 1, 2, \ldots, k-1. \quad \text{[Equation 15]}$$

Herein, s.t. (subject to) and followings represent that Equation 15 is under the condition of a set of constraints for the optimization problem.

In addition, according to the present invention, normalized eigenvalues may be obtained based on Equation 16 below.

$$u_k = \arg\min_{h} \{h^T L h\} \text{ s.t. } h^T h = 1, \quad \text{[Equation 16]}$$

$$u_i^T h = 0, i = 1, 2, \ldots, k-1.$$

According to the present invention, an alternative form such as Equation 17 below may be obtained using Equation 12.

$$u_k = \arg\min_{h} \left\{ \sum_{i=1}^{V} \sum_{j=1}^{V} W_{i,j}(h_i - h_j)^2 \right\} \text{ s.t. } h^T h = 1, \quad \text{[Equation 17]}$$

$$u_i^T h = 0, i = 1, 2, \ldots, k-1.$$

Major difficulty in the formulation of the optimization function as represented in Equation 17 above is that it is in relation to well known theory and the solving method, but very restrictive. When considering a problem of finding an optimized transform for a signal, it may be obtained by changing a non-negative weight of a graph. For example, when graph modeling is coupled with an edge detection of a signal processing, the present invention may have a great deviation according to well defined edges. However, in the case that an edge is blurred or the position is unable to be accurately determined, more fine control is required.

In designing graph transform to which the present invention is applied, it is not required to use the sum of the square differences of Equation 12 applied by a weight. In the case of changing a general definition of graph parameters according to the present invention, well known properties are lost in an aspect, but capacity occurs afford to design a transform more suitable to a specific application in the other aspect.

Accordingly, another embodiment of the present invention provides a method for generalizing a graph related transform calculation defined by the sequence of Equation 17 representing an optimization function. In the embodiment below, a method for generalizing a transform equation will be described with a specific example.

Firstly, in the present invention, the definition of a graph parameter is required to be generalized. 'A' numbers of vertex parameter set may be defined as represented in Equation 18. In this case, 'A' numbers of vertex parameter set may be represented as V-dimensional vectors.

$$v^{(1)}, v^{(2)}, \ldots, v^{(A)}, \quad \text{[Equation 18]}$$

And, 'B' numbers of edge parameter set may be defined as represented in Equation 19 below, and this may be represented as V×V matrix.

$$E^{(1)}, E^{(2)}, \ldots, E^{(B)}, \quad \text{[Equation 19]}$$

Based on Equation 18 and Equation 19 above, in the present invention, a graph signal may be defined as Equation 20 below.

$$\mathcal{G}(v^{(1)}, v^{(2)}, \ldots, v^{(A)}; E^{(1)}, E^{(2)}, \ldots, E^{(B)}). \quad \text{[Equation 20]}$$

In a compression application, in order to efficiently represent graph parameters, the number of encoding bits is very important factor, but it may not be considered in the present invention.

Next, a penalty function set may be defined as Equation 21. Herein, the penalty function represents a sort of algorithm for solving the constraint optimization problem.

$$P_k: \mathbb{R}^V \times \mathbb{R}^{A \times V} \times \mathbb{R}^{2 \times B \times 1} \to \mathbb{R}, k = 1, 2, \ldots, V, \quad \text{[Equation 21]}$$

Herein, when there is a certain constraint function in which variable vector x should be satisfied, x satisfying all of the constraint functions is called feasible, and in this case, a set of the feasible points is referred to be as a feasible region. In the case of the optimization problem without a constraint function, the feasible region becomes the whole of $\mathbb{R}^V \times \mathbb{R}^{A \times V} \times \mathbb{R}^{2 \times B \times 1}$.

Penalty function $P_k$ to which the present invention is applied may be represented as Equation 22 below.

$$P_k(h; v^{(1)}, v^{(2)}, \ldots, v^{(A)}; E^{(1)}, E^{(2)}, \ldots, E^{(B)}). \quad \text{[Equation 22]}$$

In addition, as represented in Equation 23, it may be defined V numbers of vector function set including the constraint function of $C_1, C_2, \ldots, C_V$ dimension.

$$s_k: \mathbb{R}^{V \times k} \times \mathbb{R}^{A \times V} \to \mathbb{R}^{C_k}, k = 1, 2, \ldots, V, \quad \text{[Equation 23]}$$

Using the new definition of Equations 18 to 23 above, the optimization function for obtaining an optimized transform matrix may be defined as Equation 24 below. Based on the optimization function of Equation 24, an optimized transform kernel may be obtained.

$$u_k = \qquad \text{[Equation 24]}$$
$$\underset{h}{\arg\min}\{P_k(h; v^{(1)}, v^{(2)}, \ldots, v^{(A)}; E^{(1)}, E^{(2)}, \ldots, E^{(B)})\}$$
$$\text{s.t. } h^T h = 1, u_i^T h = 0, i = 1, 2, \ldots, k-1,$$
$$s_k(u_1, u_2, \ldots, u_{k-1}, h; v^{(1)}, v^{(2)}, \ldots, v^{(A)}) \geq 0.$$

Herein, $U_k$ may represent an optimized value that optimizes a target function $P_k(\ )$ for example, may mean an optimized graph transform kernel applied to the present invention. And, "s.t." is an acronym of "subject to", and represents that it follows a constraint formula for the optimization function. The column of the optimized graph transform kernel $U_k$ may be sequentially calculated for k=1, 2, ..., V.

Although Equation 24 to which the present invention is applied is represented to cover most of general cases, as shown in the following embodiment, a constraint function is not necessarily used in a practical application. And, the same penalty function may be repeatedly used.

The penalty functions may be defined to be calculated only for a vertex value. And, the parameters in the same dimension may be calculated using the penalty function as represented in Equation 25, and for an edge value difference, the penalty function as represented in Equation 26 may be used.

$$P_i^{(u)}: \mathbb{R} \times \mathbb{R}^A \to \mathbb{R}, i=1,2,\ldots,V, \qquad \text{[Equation 25]}$$

$$P_{i,j}^{(e)}: \mathbb{R} \times \mathbb{R}^B \to \mathbb{R}, i,j=1,2,\ldots,V, \qquad \text{[Equation 26]}$$

Based on Equation 25 and Equation 26, an optimization function in the shape of Equation 27 below may be derived.

$$u_k = \underset{h}{\arg\min}\left\{\sum_{i=1}^{V} P_i^{(e)}(h_i, v_i^{(1)}, v_i^{(2)}, \ldots, v_i^{(A)}) + \right. \qquad \text{[Equation 27]}$$
$$\left. + \sum_{i=1}^{V}\sum_{j=1}^{V} P_{i,j}^{(e)}(h_i - h_j, e_{i,j}^{(1)}, \ldots, e_{i,j}^{(B)})\right\} \text{ s.t. } h^T h = 1,$$
$$u_i^T h = 0, i = 1, 2, \ldots, k-1.$$

A simple generalization of Equation 27 above including a vertex penalty function and exponents α and β may be a special case as represented in Equation 28 that corresponds to A=B=1.

$$u_k = \underset{h}{\arg\min}\left\{\sum_{i=1}^{V} v_i|h_i|^\alpha + \sum_{i=1}^{V}\sum_{j=1}^{V} e_{i,j}|h_i - h_j|^\beta\right\} \text{ s.t. } h^T h = \qquad \text{[Equation 28]}$$
$$1, u_i^T h = 0, i = 1, 2, \ldots, k-1.$$

Meanwhile, referring to FIG. 6, an encoder 600 to which the present invention is applied includes a graph-based transform unit 610, a quantization unit 620, an inverse quantization unit 630, an inverse transform unit 640, a buffer 650, a prediction unit 660 and an entropy encoding unit 670.

The encoder 600 receives a video signal, and generates a prediction error by subtracting a predicted signal outputted from the prediction unit 660 from the video signal. The generated prediction error is transmitted to the graph-based transform unit 610, and the graph-based transform unit 610 applies a transform scheme to the prediction error, thereby generating a transform coefficient. In this case, the graph-based transform unit 610 may calculate a graph-based transform matrix obtained by Equation 24, Equation 27 or Equation 28 above, and may perform a transformation using it. In addition, graph-based transform unit 610 may perform the embodiments described in the present specification.

As another embodiment to which the present invention is applied, the graph-based transform unit 610 may select more proper transform matrix by comparing the graph-based transform matrix obtained by Equation 24, Equation 27 or Equation 28 above with the transform matrix obtained from the transform unit 120 of FIG. 1 above.

The quantization unit 620 transmits the quantized coefficient to the entropy encoding unit 670 by quantizing the generated transform coefficient.

The entropy encoding unit 670 performs entropy coding for the quantized signal and outputs the entropy-coded signal.

The quantized signal outputted from the quantization unit 620 may be used for generating a prediction signal. For example, the inverse quantization unit 630 and the inverse transform unit 640 in a loop of the encoder 600 may perform the inverse quantization and the inverse transformation for the quantized signal such that the quantized signal is restored with the prediction error. The restored signal may be generated by adding the restored prediction error to the prediction signal outputted by the prediction unit 660.

The buffer 650 stores the restored signal for a future reference.

The prediction unit 660 may generate a prediction signal using the signal stored in the buffer 650. In this case, the present invention relates to predict an area within a target image efficiently using an area within an anchor image. Herein, the anchor image may mean a reference image, a reference picture or a reference frame. The efficiency may be determined by evaluating a mean square error that quantifies a rate-distortion cost or a distortion within the prediction error.

The present invention proposes a method for distinguishing a vertex and an edge within a graph and encoding or decoding a residual signal. For example, according to the embodiments of the present invention, various embodiments may be performed through the graph-based transform unit 610. The graph-based transform unit 610 may be included in the encoder 600 or the decoder 700.

Figure 7:
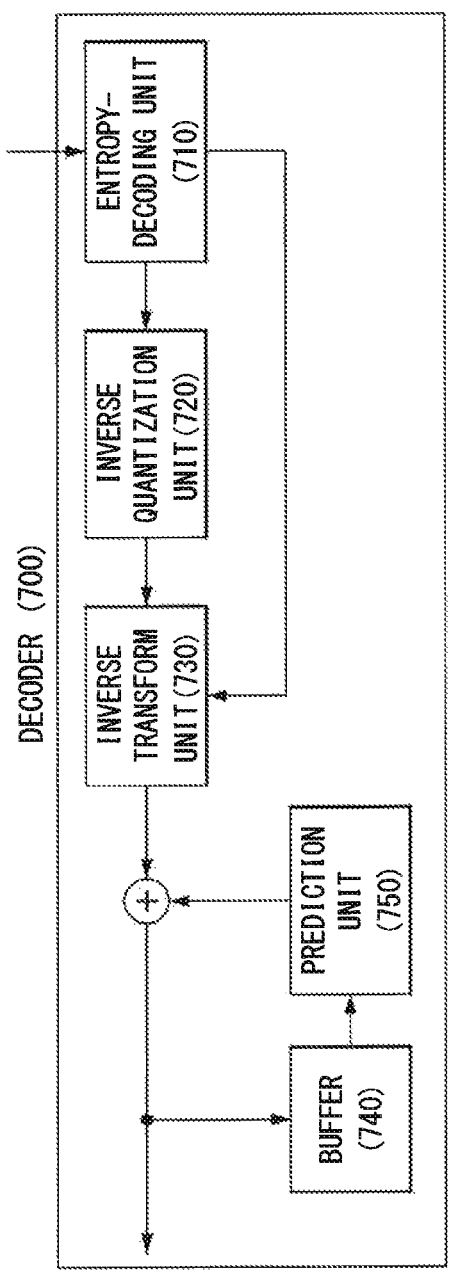
FIG. 7 illustrates a schematic block diagram of a decoder that processes a graph-based signal as an embodiment to which the present invention is applied.

FIG. 7 illustrates a schematic block diagram of a decoder that processes a graph-based signal as an embodiment to which the present invention is applied.

A decoder 700 shown in FIG. 7 receives a signal outputted from the encoder 600.

An entropy decoding unit 710 performs entropy decoding for a received signal. An inverse quantization unit 720 obtains a transformation coefficient from the entropy-decoded signal based on the information of a quantization step size.

An inverse transform unit 730 obtains a prediction error by performing inverse transformation for a transformation coefficient. In this case, the inverse transformation may mean an inverse transformation for the graph-based transformation obtained from the encoder 600.

A restored signal is generated by adding the obtained prediction error to the prediction signal outputted from a prediction unit 750, which is performed in a restoration unit (not shown).

A buffer 740 stores the restored signal for a future reference of the prediction unit 750.

The prediction unit 750 generates a prediction signal based on the signal stored in the buffer 740 which is restored previously and the prediction vector to which the present invention is applied.

In the present invention, the graph-based transformation obtained based on a graph parameter may be used in the encoder 600 or the decoder 700.

Figure 8:
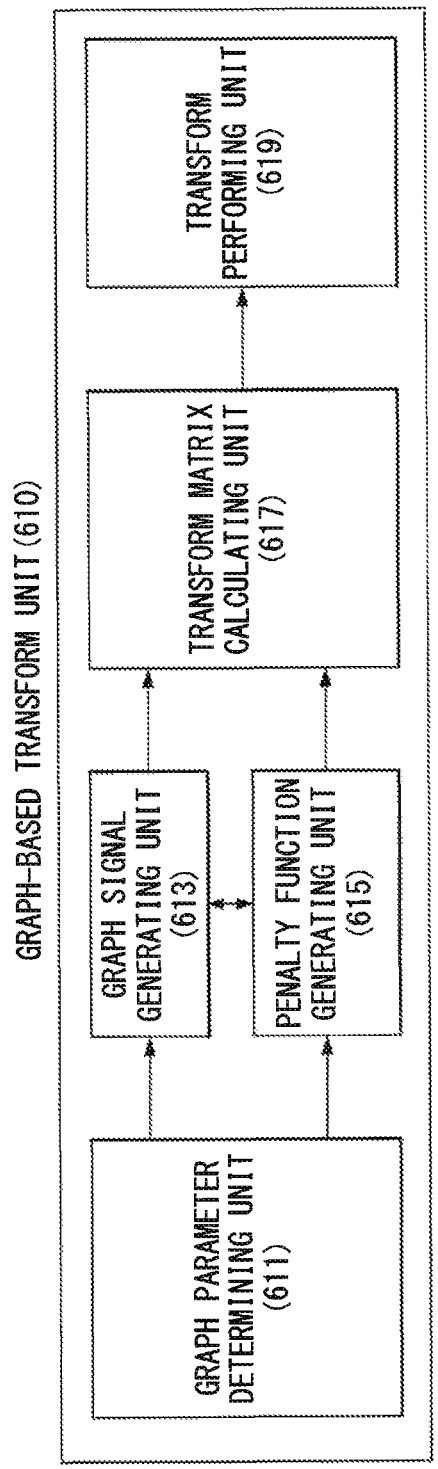
FIG. 8 illustrates an inner block diagram of a graph-based transform unit as an embodiment to which the present invention is applied.

FIG. 8 illustrates an inner block diagram of a graph-based transform unit as an embodiment to which the present invention is applied.

Referring to FIG. 8, the graph-based transform unit 610 may include a graph parameter determining unit 611, a graph signal generating unit 613, a penalty function generating unit 615, a transform matrix calculating unit 617 and a transform performing unit 619.

The graph parameter determining unit 611 may extract a graph parameter within a graph that corresponds to a target unit of a video signal or a residual signal. For example, the graph parameter may include at least one of a vertex parameter and an edge parameter. The vertex parameter may include at least one of a vertex position and a vertex number, and the edge parameter may include at least one of an edge weighting value and an edge weighting value number. In addition, the graph parameter may be defined as a set of a predetermined number.

According to an embodiment of the present invention, the graph parameter extracted from the graph parameter determining unit 611 may be represented as a generalized form. For example, 'A' numbers of vertex parameter set may be defined as represented in Equation 18 above. In this case, 'A' numbers of vertex parameter set may be represented as V-dimensional vectors. And, 'B' numbers of edge parameter set may be defined as represented in Equation 19 above, and this may be represented as V×V matrix.

The graph signal generating unit 613 may generate a graph signal based on the graph parameter extracted from the graph parameter determining unit 611. In this case, the graph signal may be defined as Equation 20 above.

The graph-based transform unit 610 may define a penalty function set in order to solve the constraint optimization problem. And accordingly, the penalty function generating unit 615 may generate a penalty function for calculating an optimal transform matrix. For example, the penalty function generating unit 615 may define a penalty function set as represented in Equation 21 above.

According to an embodiment of the present invention, the penalty functions may be defined to be calculated only for a vertex value. And, the parameters in the same dimension may be calculated using the penalty function as represented in Equation 25 above, and for an edge value difference, the penalty function as represented in Equation 26 above may be used.

The transform matrix calculating unit 617 may generate an optimization function based on at least one of the generalized graph parameter and the penalty function, and may calculate an optimized transform matrix that satisfies the optimization function. For example, the transform matrix calculating unit 617 may derive an optimization function as represented in Equation 27 above, based on Equation 25 and Equation 26 above.

According to an embodiment of the present invention, by using the graph signal based on the generalized graph parameter and the penalty function, an optimization function for obtaining an optimized transform matrix may be generated. For example, the optimization function may be defined as Equation 24 above.

According to an embodiment of the present invention, an optimization function may be defined based on a penalty function for at least one of the penalty function for a vertex and an edge value difference.

The transform performing unit 619 may perform transform using the optimized transform matrix obtained from the transform matrix calculating unit 617.

In relation to FIG. 8 above, in the present specification, the procedure of performing the graph-based transform will be described by subdividing it for each function, but the present invention is not limited thereto. For example, the graph-based transform unit 610 may include a graph signal generating unit and a transform unit, largely. In this case, the function of the graph parameter determining unit 611 may be performed in the graph signal generating unit, and the functions of the penalty function generating unit 615, the transform matrix calculating unit 617 and the transform performing unit 619 may be performed in the transform unit. In addition, the function of the transform unit may be divided into a transform matrix calculating unit and a transform performing unit.

Figure 9:
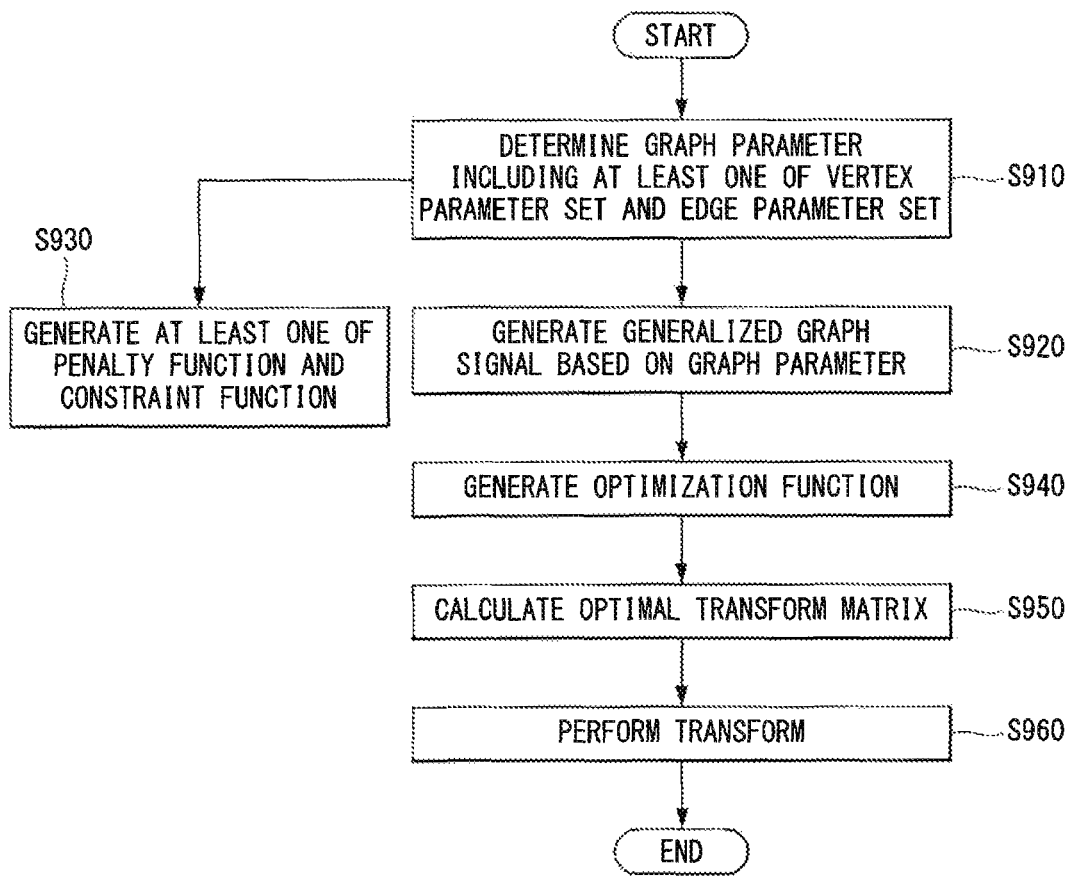
FIG. 9 is a flowchart for describing a procedure of calculating an optimized transform matrix based on a generalized graph parameter and a penalty function, as an embodiment to which the present invention is applied.

FIG. 9 is a flowchart for describing a procedure of calculating an optimized transform matrix based on a generalized graph parameter and a penalty function, as an embodiment to which the present invention is applied.

An encoder may generate a prediction signal from a received video signal, and may generate a residual signal by subtracting the prediction signal from the video signal. A transform is performed for the residual signal. In this case, a graph-based transform may be performed by applying the graph-based signal processing technique.

The encoder may extract a graph parameter in a graph that corresponds to the video signal or a target unit (e.g., transform unit) of the residual signal (step, S910). For example, the graph parameter may include at least one of a vertex parameter set and an edge parameter set. Herein, the graph parameter may be represented as a generalized form. For example, 'A' numbers of vertex parameter set may be represented as V-dimensional vectors as represented in Equation 18 above. And, 'B' numbers of edge parameter set may be represented as V×V matrix as represented in Equation 19 above. This may be performed in the graph-based transform unit 610, particularly, in the graph parameter determining unit 611.

The encoder may generate a generalized graph signal based on the generalized graph parameter (step, S920). This may be performed in the graph-based transform unit 610, particularly, in the graph signal generating unit 613.

Meanwhile, the encoder may generate at least one of a penalty function and a constraint function in order to solve the constraint optimization problem (step, S930). For example, based on the generalized graph parameter, at least one of the penalty function set and the constraint function set. This may be performed in the graph-based transform unit 610, particularly, in the penalty function generating unit 615. Herein, the penalty function may be generated based on the generalized graph signal.

And, the penalty function may include a first penalty function component for a vertex parameter set and a second penalty function component for an edge parameter set. In this case, the optimization function may be comprised of the summation of the first penalty function component for the vertex parameter set and the second penalty function component for the edge parameter set. Herein, the vertex parameter set may be represented as V-dimensional vector, and the edge parameter set may be represented as V×V matrix.

The encoder may generate an optimization function based on at least one of the penalty function and the constraint function and the generalized graph signal (step, S940), and may obtain an optimal transform matrix (or optimal transform kernel) that satisfies the optimization function (step, S950). This may be performed in the graph-based transform unit 610, particularly, in transform matrix calculating unit 617.

Based on the optimized transform matrix which is calculated, a transform for the target unit may be performed (step, S960).

Figure 10:
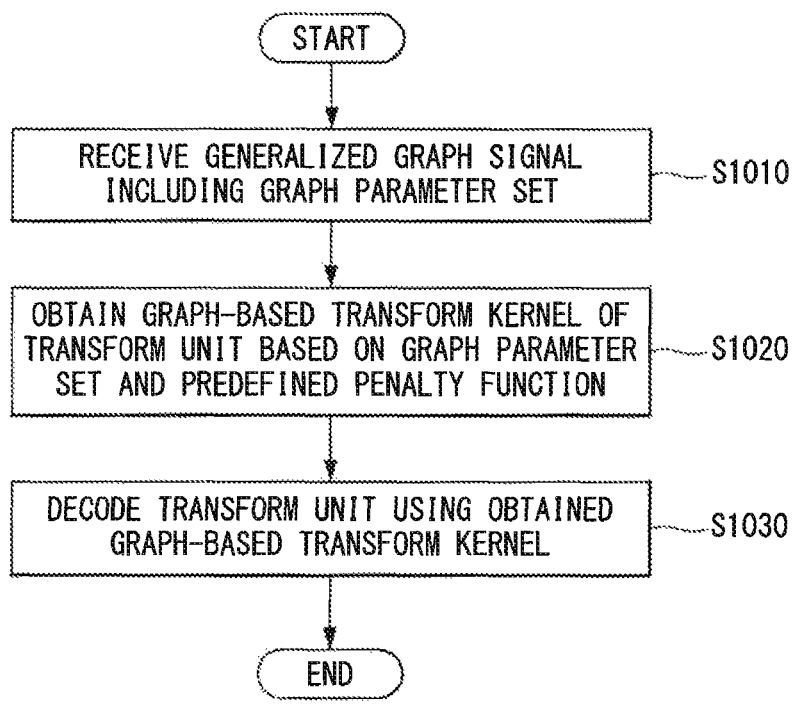
FIG. 10 is a flowchart for describing a procedure of obtaining a graph-based transform kernel using a generalized parameter set, as an embodiment to which the present invention is applied.

FIG. 10 is a flowchart for describing a procedure of obtaining a graph-based transform kernel using a generalized parameter set, as an embodiment to which the present invention is applied.

A decoder, to which the present invention is applied, may receive a generalized graph signal including a graph parameter set (step, S1010). Herein, the graph parameter set may include at least one of a vertex parameter set represented as V-dimensional vector and an edge parameter set represented as V×V matrix. The graph parameter set may be transmitted to a syntax element or may be induced from other information in the decoder.

The decoder may obtain a graph-based transform kernel of a transform unit based on the graph parameter set and the predefined penalty function (step, S1020). Herein, the predefined penalty function may be that of generated based on the generalized graph signal. And, the graph-based transform kernel may be calculated by using an optimization function, and the optimization function is based on the graph parameter set and the predefined penalty function.

In addition, the decoder may decode the transform unit using the obtained graph-based transform kernel (step, S1030). In this case, the graph-based transform kernel may be calculated by the optimization function based on the graph parameter set and the predefined penalty function. In addition, the optimization function may be comprised of the summation of a first penalty function component for the vertex parameter set and a second penalty function component for the edge parameter set. The graph-based transform kernel may indicate a value in which the optimization function is a minimum.

As such, by providing a new method for calculating a graph-based transform using generalization of a graph parameter, the present invention may avoid the sharp discontinuity problem of vectors for defining the graph-based transform, may better control the transform properties, and may be applicable to various applications. Furthermore, an excessive overhead of a bit rate required to encode a graph signal may be avoided.

As described above, the embodiments explained in the present invention may be implemented and performed on a processor, a microprocessor, a controller or a chip. For example, functional modules explained in FIG. 1, FIG. 2, FIG. 6, FIG. 7 and FIG. 8 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for decoding a video signal using a graph-based transform, comprising:
receiving a generalized graph signal including a graph parameter set, wherein the graph parameter set includes a vertex parameter set represented as a V-dimensional vector and an edge parameter set represented as a V×V matrix;
obtaining a graph-based transform kernel of a transform unit based on the graph parameter set and a predetermined penalty function; and
decoding the transform unit using the graph-based transform kernel,
wherein the graph-based transform kernel is calculated by an optimization function based on the graph parameter set and the predetermined penalty function,
wherein the optimization function comprises a summation of a first penalty function component for a vertex parameter set and a second penalty function component for an edge parameter set, and
wherein the graph-based transform kernel indicates a value that minimizes the optimization function.

2. The method of claim 1,
wherein the predetermined penalty function is generated based on the generalized graph signal.

3. A method for performing a graph-based transform based on a generalized graph signal, comprising:
determining a graph parameter including a vertex parameter set and an edge parameter set, wherein the graph parameter set includes a vertex parameter set represented as a V-dimensional vector and an edge parameter set represented as a V×V matrix;

generating a generalized graph signal based on the graph parameter;

generating a penalty function and a constraint function based on the graph parameter;

generating an optimization function based on at least one of the penalty function and the constraint function and the generalized graph signal, wherein the optimization function comprises a summation of a first penalty function component for a vertex parameter set and a second penalty function component for an edge parameter set;

obtaining an optimal graph-based transform kernel in which the optimization function is a minimum; and performing a transform for a transform unit using the optimal graph-based transform kernel.

4. The method of claim 3, wherein the penalty function is generated based on the generalized graph signal.

5. An apparatus for decoding a video signal using a graph-based transform, comprising:

a storage device configured to store the video signal; and at least one processor configured to:

receive a generalized graph signal including a graph parameter set, wherein the graph parameter set includes a vertex parameter set represented as V-dimensional vector and an edge parameter set represented as V×V matrix; and obtain a graph-based transform kernel of a transform unit based on the graph parameter set and a predetermined penalty function; and decode the transform unit using the graph-based transform kernel, wherein the graph-based transform kernel is calculated by an optimization function based on the graph parameter set and the predetermined penalty function, wherein the optimization function comprises a summation of a first penalty function component for a vertex parameter set and a second penalty function component for an edge parameter set, and wherein the graph-based transform kernel indicates a value that minimizes the optimization function.

6. The apparatus of claim 5, wherein the predetermined penalty function is generated based on the generalized graph signal.

7. An apparatus for performing a graph-based transform using a generalized graph signal, comprising:

a storage device configured to store video data; and at least one processor configured to:

determine a graph parameter including a vertex parameter set and an edge parameter set, and to generate a generalized graph signal based on the graph parameter, wherein the graph parameter set includes a vertex parameter set represented as a V-dimensional vector and an edge parameter set represented as a V×V matrix;

generate a penalty function and a constraint function based on the graph parameter, to generate an optimization function based on at least one of the penalty function and the constraint function and the generalized graph signal; and obtain an optimal graph-based transform kernel in which the optimization function is a minimum, wherein the optimization function comprises a summation of a first penalty function component for a vertex parameter set and a second penalty function component for an edge parameter set; and perform a transform for a transform unit using the optimal graph-based transform kernel.

8. The apparatus of claim 7, wherein the penalty function is generated based on the generalized graph signal.

* * * * *